United States Patent [19]
Yano et al.

[11] Patent Number: 5,324,799
[45] Date of Patent: Jun. 28, 1994

[54] POLYETHYLENE AND PROCESS OF PRODUCTION THEREOF

[76] Inventors: Akihiro Yano, 3-4-1, Betsuemi, Yokkaichi-shi, Mie-ken; Satoru Yamada, 1659, Shinden, Taguchi Komono-cho, Mie-gun, Mie-ken; Kunitaka Yamada, 3-5-7, Betsumei, Yokkaichi-shi, Mie-ken, all of Japan

[21] Appl. No.: 943,091

[22] Filed: Sep. 10, 1992

Related U.S. Application Data

[63] Continuation-in-part of Ser. No. 662,167, Feb. 28, 1991, abandoned.

[30] Foreign Application Priority Data

Mar. 6, 1990 [JP] Japan .................................. 2-52626
Aug. 9, 1990 [JP] Japan ................................. 2-209302

[51] Int. Cl.$^5$ .......................... C08F 4/70; C08F 10/02
[52] U.S. Cl. .................................... 526/139; 526/161; 526/352
[58] Field of Search ............................................ 526/139

[56] References Cited

U.S. PATENT DOCUMENTS

| | | |
|---|---|---|
| 3,287,335 | 11/1966 | Stuetz . |
| 3,645,992 | 2/1972 | Elston . |
| 4,205,021 | 5/1980 | Morita et al. . |
| 4,438,243 | 3/1984 | Kashiwa et al. . |
| 4,537,982 | 8/1985 | Starzewski et al. . |
| 4,586,995 | 5/1986 | Randall et al. . |
| 4,691,036 | 9/1987 | Starzewski et al. . |
| 4,724,273 | 2/1988 | Fink et al. . |

FOREIGN PATENT DOCUMENTS

| | | |
|---|---|---|
| 0194456 | 9/1986 | European Pat. Off. . |
| 0202670 | 11/1986 | European Pat. Off. . |
| 0250999 | 1/1988 | European Pat. Off. . |
| 0381495 | 8/1990 | European Pat. Off. . |
| 3445090 | 6/1986 | Fed. Rep. of Germany . |
| 1575779 | 7/1969 | France . |
| 833147 | 3/1960 | United Kingdom . |
| 1227562 | 4/1971 | United Kingdom . |

OTHER PUBLICATIONS

W. Keim et al., "Novel Nickel- and Palladium-complexes with aminobis (imino) phosphorane ligands for the polymerization of ethylene," Angewandte Chemie, vo. 20, No. 1, 1981.

U.S. patent application 07/685,608 filed on Apr. 15, 1991, Soga et al., *Process for Producing Polyolefin.*

U.S. patent application 07/794,606 filed on Nov. 15, 1991, Yano et al., *Polyethylene and method of producing thereof.*

*Primary Examiner*—Edward J. Smith
*Attorney, Agent, or Firm*—Kenyon & Kenyon

[57] ABSTRACT

Polyethylene having from 1 to 60 methyl branches and from 1 to 60 hexyl or higher branches per 1,000 carbon atoms, a g-value of from 0.5 to 0.9, a limiting viscosity [η] of from 0.005 to 20.0 dl/g as measured at 140° C. in o-dichlorobenzene, a molecular weight distribution not larger than 3 as determined by gel-permeation chromatography (GPC), and not more than 0.2 of terminal double bond in 1,000 carbon atoms, and process for producing the same, comprising polymerizing ethylene in the presence of a catalyst composed of a coordination nickel compound of bivalent nickel, an organoaluminum compound, and an amino-bis(imino)-phosphorane represented by the general formula (I) below:

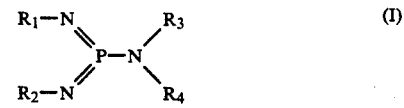

where $R_1$, $R_2$, $R_3$, and $R_4$ may be the same or different mutually and are respectively n-alkyl, isoalkyl, aryl, or trialdylsilyl.

5 Claims, 1 Drawing Sheet

POLYETHYLENE AND PROCESS OF PRODUCTION THEREOF

CROSS-REFERENCE TO RELATED APPLICATION

This application is a continuation-in-part of U.S. patent application Ser. No. 07/662,167, filed Feb. 28, 1991 now abandoned.

BACKGROUND OF THE INVENTION

1. Field of the Invention

The present invention relates to novel polyethylene which has a branching structure. The present invention also relates to a process of production of the novel polyethylene.

2. Related Background Art

Generally, polymerization of ethylene with a free radical initiator at exceedingly high temperature and pressure gives polyethylene which has long chain branches having length comparable to the main polymer chain thereof. On the contrary, polymerization of ethylene with a Ziegler-Natta catalyst gives polyethylene which has almost no branches.

In order to produce branched polyethylene by use of a Ziegler-Natta catalyst, ethylene is generally copolymerized with α-olefin. The copolymerization, however, does not give long chain branches as those formed by radical polymerization.

In an attempt to obtain low-pressure polyethylene having such long chain branching, ethylene is oligomerized by use of a nickel catalyst such as disclosed in Japanese Patent Application Laid-Open No. 63-12607, and the resulting oligomer is copolymerized with ethylene in the presence of a chromium catalyst. This method does not give such a long chain branching as produced by free radical polymerization.

SUMMARY OF THE INVENTION

An object of the present invention is to provide a novel polyethylene having a branching structure.

Another object of the present invention is to provide a process for producing the novel polyethylene having branching structure.

According to an aspect of the present invention, there is provided polyethylene having from 1 to 60 methyl branches and from 1 to 60 hexyl or higher branches per 1,000 carbon atoms, a g-value of from 0.5 to 0.9, a limiting viscosity $[\eta]$ of from 0.005 to 20.0 dl/g as measured at 140° C. in o-dichlorobenzene, and a molecular weight distribution is not more than 3 as measured by gel permeation chromatography (GPC).

According to another aspect of the present invention, there is provided a process for producing polyethylene, comprising polymerizing ethylene in the presence of a catalyst composed of a coordination nickel compound of bivalent nickel, an organoaluminum compound, and an amino-bis(imino)-phosphorane represented by the general formula (I) below:

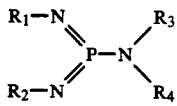
(I)

where $R_1$, $R_2$, $R_3$, and $R_4$ may be the same or different mutually and are respectively n-alkyl, isoalkyl, aryl, or trialkylsilyl.

DESCRIPTION OF THE PREFERRED EMBODIMENT

Figure 1:
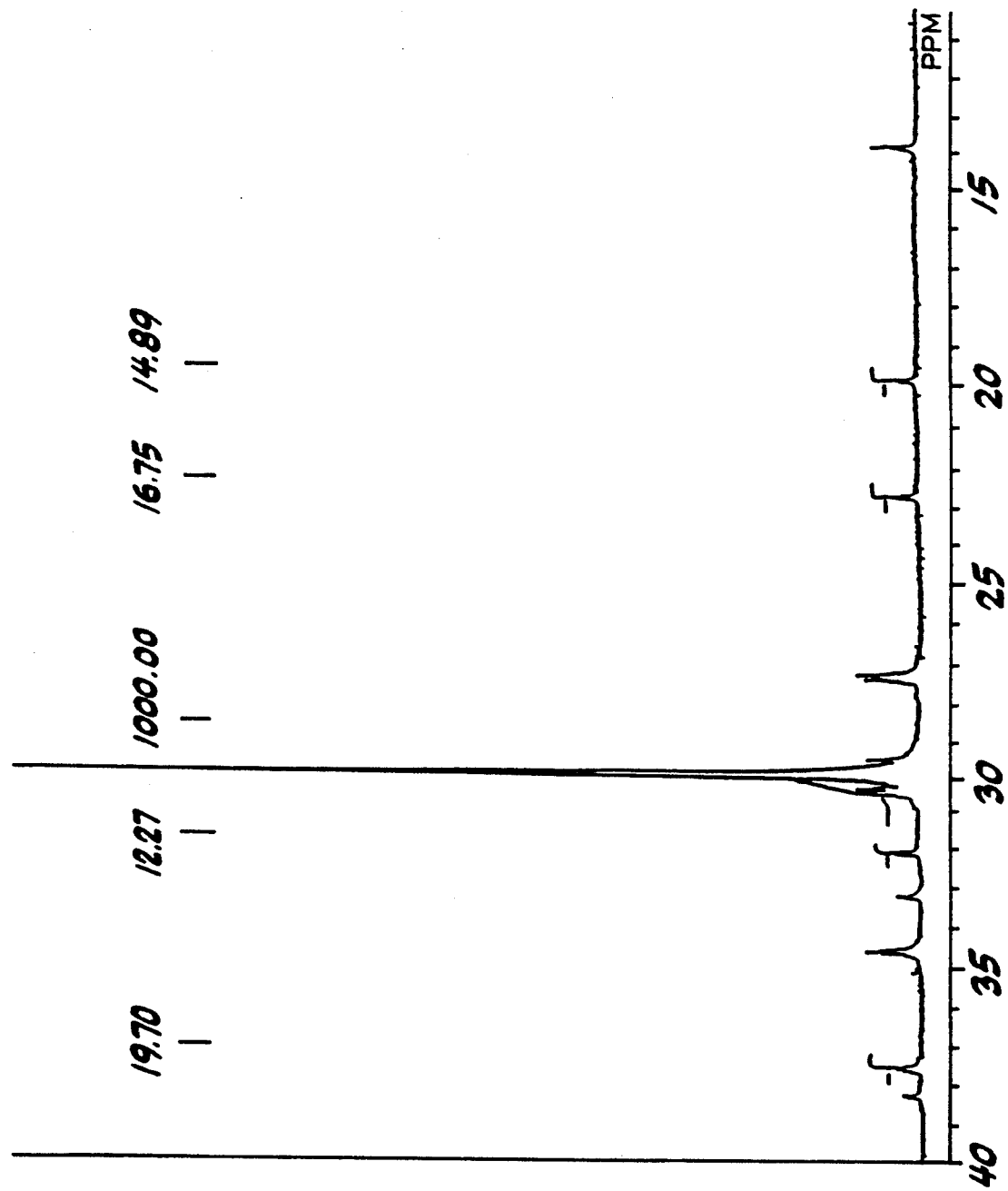
FIG. 1 shows the $^{13}$C-NMR spectrum of the polyethylene obtained in Example 1.

The polyethylene of the present invention has from 1 to 60 methyl branches and from 1 to 60 hexyl or higher branches per 1,000 carbon atoms as short branches in its structure. The branches are confirmed to exist by $^{13}$C-NMR. The short branches can be assigned on the basis of J. C. Randall, J. Polym. Sci., Polym. Phys. Ed., 11, 275 (1973), for example.

In the structure of polyethylene, the existence of long chain branches may be presumed if the polyethylene has a g-value, namely $g=[\eta]/[\eta]_l$, of 1 or below, where $[\eta]$ is a limiting viscosity of a branched polyethylene, and $[\eta]_l$ is a limiting viscosity of a linear polyethylene having the same melt index. The branched polyethylene of the present invention has a g-value of from 0.5 to 0.9, which suggests the existence of long branches having comparable length to the main polymer chain. The molecular weight distribution of the polyethylene according to the present invention is expressed in the term of $\overline{M}w/\overline{M}n$, which is obtained by preparing a calibration curve of polystylene using a standard polystylene (prepared by Tosoh) having a known molecular weight, calculating the molecular weight of polyetylene by conversion from the standard polysthylene and calculating a number average molecular weight $\overline{M}n$ and a weight average molecular weight $\overline{M}w$. The molecular weight distribution of the polyethylene according to the present invention is not larger than 3.

The polyethylene of the present invention is completely novel in that it has neither ethyl branches nor butyl branches which exist in polyethylene produced by radical polymerization at high temperature and high pressure. Furthermore, this novel polyethylene has almost no terminal double bonds, which is confirmed by infrared absorption spectrum, the number of double bonds being not more than 0.2 per 1,000 carbon atoms. Such polyethylene having no double bond is characteristically stable during processing.

The novel polyethylene can be produced by homopolymerizing ethylene at a temperature of from −78° C. to 200° C. under an ethylene pressure of from 1 to 200 kg/cm² in the presence of a catalyst composed of a coordination nickel compound of bivalent nickel, an organoaluminum compound, and an amino-bis(imino)-phosphorane represented by the general formula (I) below:

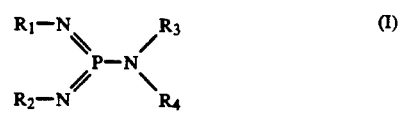
(I)

$R_1$, $R_2$, $R_3$, and $R_4$ may be the same or different mutually and are respectively n-alkyl, isoalkyl, aryl, or trialkylsilyl.

The coordination nickel compound of bivalent nickel includes specifically nickel compounds having β-diketone as ligands, represented by the general formula (II) below:

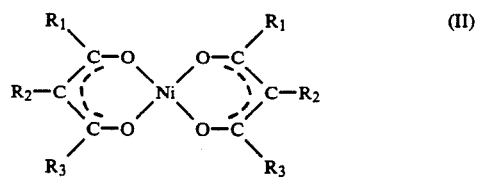

where $R_1$, $R_2$, and $R_3$ may be the same or different mutually and are respectively hydrogen, n-alkyl (having 1 to 4 carbons), isoalkyl (having 3 to 5 carbons), tert-alkyl (having 4 to 6 carbons), n-fluoroalkyl (having 1 to 4 carbons) or phenyl; nickel stearate; nickel acetate; and the like.

The organoaluminum compounds are those represented by the general formula, $AlR_sX_{3-s}$ wherein s is an integer of 2 or 3; R is alkyl of 1 to 12 carbons; and X is halogen or alkoxy. Specifically the organic aluminum compound includes trimethylaluminum, triethylaluminum, triisopropylaluminum, tri-n-propylaluminum, triisobutylaluminum, tri-n-butylaluminum, tri-n-hexylaluminum, tri-n-octylaluminum, tri-n-decylaluminum, tri-n-dodecylaluminum, dimethylaluminum chloride, diethylaluminum chloride, diisopropylaluminum chloride, di-n-propylaluminum chloride, diisobutrlaluminum chloride, di-n-butylaluminum chloride, di-n-hexylaluminum chloride, di-n-octylaluminum chloride, di-n-decylaluminum chloride, di-n-dodecylaluminum chloride, dimethylaluminum ethoxide, diethylaluminum ethoxide, di-n-propylaluminum ethoxide, di-n-butylaluminum ethoxide, di-n-hexylaluminum ethoxide, di-n-octylaluminum ethoxide, di-n-decylaluminum ethoxide, di-n-dodecylaluminum ethoxide, and the like.

The amino(imino)phosphorane represented by the general formula (I) includes specifically bis(trimethylsilyl)amino-bis(trimethylsilylimino)-phosphorane, and the like. Such a compound may be prepared, for example, according to the method of O. J. Scherer and N. Kush: Chem. Ber. 107, 2123 (1974).

In the polymerization of ethylene by use of the three-component catalyst, the ratio (molar ratio) of the nickel compound to the animo-bis(imino)phosphorane is preferably in the range of from 1:1 to 1:100. The ratio (molar ratio) of the nickel compound to the aluminum compound is preferably in the range of from 1:1 to 1:1,000. The respective components may be introduced either in a solid form or in a solution in a solvent into a polymerization vessel. In adding the catalyst components, preferably the nickel compound and the amino(imino)phosphorane is firstly brought into contact with each other. Ethylene may be polymerized either in a liquid phase or in a gaseous phase. The polymerization in a liquid phase is conducted preferably by use of an inert solvent. Any of inert solvents which are generally used in the related technical field may be used, including aliphatic hydrocarbons, aromatic hydrocarbons, and halogenated hydrocarbons having from 4 to 20 carbons. The specific examples are hexane, heptane, pentane, octane, decane, cyclohexane, benzene, toluene, xylene, chlorobenzene, ethylene dichloride, kerosene, and the like.

The polyethylene of the present invention can be produced by polymerization of ethylene at a low pressure. The polyethylene having such a structure has not been produced by a low pressure process.

The present invention is described in more detail by reference to Examples without limiting the invention in any way.

EXAMPLE 1

Into a 2-liter stainless steel reactor equipped with a magnetic stirrer, which had been purged sufficiently with nitrogen, 500 ml of toluene, 1.0 mmol of nickel acetylacetonate, and 5.0 mmol of bis(trimethylsilyl)amino-bis(trimethylsilylimino)-phosphorane were added. Then 8.0 mmol of triisobutylaluminum was added thereto, and the internal temperature was controlled to be at 40° C. Subsequently, ethylene was introduced therein, and was polymerized for 3.0 hours by keeping the internal pressure at 25 kg/cm²G. After the completion of the reaction, the unreacted ethylene was removed, and the catalyst was decomposed by hydrochloric acid-methanol solution. The reaction mixture was poured into methanol to recover the resulting polymer, which was dried under reduced pressure for 8 hours, yielding 61 g of polymer.

The melting point was 77.0° C. as measured by differential scanning calorimetry (DSC). The limiting viscosity was 1.14 dl/g at 140° C. in o-dichlorobenzene.

FIG. 1 shows the $^{13}$C-NMR spectrum of the resulting polymer. The peaks ascribable to a methyl branch are observed at 20.0 ppm, 27.5 ppm, 30.4 ppm, 33.2 ppm and 37.5 ppm; the peaks ascribable to the hexyl or higher branch are observed at 14.3 ppm, 23.1 ppm, 27.4 ppm, 30.7 ppm, 32.4 ppm, 34.6 ppm, and 38.3 ppm; and no other peak ascribable to branching was observed. From the spectrum, 13 methyl branches and 25 hexyl and higher branches are found to exist per 1,000 carbon atoms. The g-value of the polymer was 0.86, and the molecular weight distribution determined by GPC was 2.2.

In infrared spectrum, almost no peak was observed at 890 cm$^{-1}$, 910 cm$^{-1}$, and 965 cm$^{-1}$ which are ascribable to a terminal double bond, thus the terminal double bond being 0.1 or less in number per 1,000 carbon atoms.

EXAMPLE 2

Into a 2-liter stainless steel reactor equipped with a magnetic stirrer, which had been purged sufficiently with nitrogen, 500 ml of toluene, 2.0 mmol of nickel acetylacetonate, and 10.0 mmol of bis(trimethylsilyl)amino-bis(trimethylsilylimino)-phosphorane were added. Then 16.0 mmol of triisobutylaluminum was added thereto, and the internal temperature was controlled to be at 30° C. Subsequently, ethylene was introduced therein, and was polymerized for 3.0 hours by keeping the internal pressure at 25 kg/cm²G. After the completion of the reaction, the unreacted ethylene was removed, and the catalyst was decomposed by hydrochloric acid-methanol solution. The reaction mixture was poured into methanol to recover the resulting polymer, which was dried under reduced pressure for 8 hours, yielding 174 g of polymer.

The melting point was 84.6° C. as measured by differential scanning calorimetry (DSC). The limiting viscosity was 1.83 dl/g at 140° C. in o-dichlorobenzene. The number of methyl branches was 14 per 1,000 carbon atoms, and that of hexyl and higher branches was 19 per 1,000 carbon atoms according to $^{13}$C-NMR spectrum. The g-value was 0.71, the molecular weight distribution determined by GPC was 2.1, and the number of the terminal double bond was not more than 0.2 in 1,000 carbon atoms.

EXAMPLE 3

Into a 2-liter stainless steel reactor equipped with a magnetic stirrer, which had been purged sufficiently with nitrogen, 500 ml of toluene, 2.0 mmol of nickel acetylacetonate, and 10.0 mmol of bis(trimethylsilyl)amino-bis(trimethylsilylimino)-phosphorane were added. Then 16.0 mmol of diethylaluminum chloride was added thereto, and the internal temperature was controlled to be at 20° C. Subsequently, ethylene was introduced therein, and was polymerized for 3.0 hours by keeping the internal pressure at 25 kg/cm$^2$G. After the completion of the reaction, the unreacted ethylene was removed, and the catalyst was decomposed by hydrochloric acid-methanol solution. The reaction mixture was poured into methanol to recover the resulting polymer, which was dried under reduced pressure for 8 hours, yielding 100 g of polymer.

The melting point was 87.2° C. as measured by differential scanning calorimetry (DSC). The limiting viscosity was 1.54 dl/g at 140° C. in o-dichlorobenzene. The number of methyl branches was 12 per 1,000 carbon atoms, and that of hexyl and higher branches was 14 per 1,000 carbon atoms according to $^{13}$C-NMR spectrum. The g-value was 0.72, the molecular weight distribution determined by GPC was 2.3, and the number of the terminal double bond was not more than 0.2 in 1,000 carbon atoms.

EXAMPLE 4

Into a 2-liter stainless steel reactor equipped with a magnetic stirrer, which had been purged sufficiently with nitrogen, 500 ml of toluene, 2.0 mmol of nickel acetylacetonate, and 10.0 mmol of bis(trimethylsilyl)amino-bis(trimethylsilylimino)-phosphorane were added. Then 16.0 mmol of triethylaluminum was added thereto, and the internal temperature was controlled to be at 20° C. Subsequently, ethylene was introduced therein, and was polymerized for 3.0 hours by keeping the internal pressure at 25 kg/cm$^2$G. After the completion of the reaction, the unreacted ethylene was removed, and the catalyst was decomposed by hydrochloric acid-methanol solution. The reaction mixture was poured into methanol to recover the resulting polymer, which was dried under reduced pressure for 8 hours, yielding 100 g of polymer.

The melting point was 92.0° C. as measured by differential scanning calorimetry (DSC). The limiting viscosity was 1.98 dl/g at 140° C. in o-dichlorobenzene. The number of methyl branches was 19 per 1,000 carbon atoms, and that of hexyl and higher branches was 17 per 1,000 carbon atoms according to $^{13}$C-NMR spectrum. The g-value was 0.66, the molecular weight distribution determined by GPC was 2.0, and the number of the terminal double bond was not more than 0.2 in 1,000 carbon atoms.

EXAMPLE 5

Into a 2-liter stainless steel reactor equipped with a magnetic stirrer, which had been purged sufficiently with nitrogen, 500 ml of toluene, 2.0 mmol of nickel acetylacetonate, and 10.0 mmol of bis(trimethylsilyl)amino-bis(trimethylsilylimino)-phosphorane were added. Then 16.0 mmol of diethylaluminum ethoxide was added thereto, and the internal temperature was controlled to be at 30° C. Subsequently, ethylene was introduced therein, and was polymerized for 3.0 hours by keeping the internal pressure at 25 kg/cm$^2$G. After the completion of the reaction, the unreacted ethylene was removed, and the catalyst was decomposed by hydrochloric acid-methanol solution. The reaction mixture was poured into methanol to recover the resulting polymer, which was dried under reduced pressure for 8 hours, yielding 24 g of polymer.

The melting point was 73.0° C. as measured by differential scanning calorimetry (DSC). The limiting viscosity was 1.12 dl/g at 140° C. in o-dichlorobenzene. The number of methyl branches was 30 per 1,000 carbon atoms, and that of hexyl and higher branches was 18 per 1,000 carbon atoms according to $^{13}$C-NMR spectrum. The g-value was 0.75, the molecular weight distribution determined by GPC was 2.2, and the number of the terminal double bond was not more than 0.2 in 1,000 carbon atoms.

EXAMPLE 6

Into a 2-liter stainless steel reactor equipped with a magnetic stirrer, which had been purged sufficiently with nitrogen, 500 ml of toluene, 2.0 mmol of bis-(1,1,1,5,5,5-hexafluoro-2,4-pentanediono)-nickel(II), and 10.0 mmol of bis(trimethylsilyl)amino-bis-(trimethylsilylimino)phosphorane were added. Then 16.0 mmol of triisobutylaluminum was added thereto, and the internal temperature was controlled to be at 20° C. Subsequently, ethylene was introduced therein, and was polymerized for 3.0 hours by keeping the internal pressure at 25 kg/cm$^2$G. After the completion of the reaction, the unreacted ethylene was removed, and the catalyst was decomposed by hydrochloric acid-methanol solution. The reaction mixture was poured into methanol to recover the resulting polymer, which was dried under reduced pressure for 8 hours, yielding 4 g of polymer.

The melting point was 101° C. as measured by differential scanning calorimetry (DSC). The limiting viscosity was 0.96 dl/g at 140° C. in o-dichlorobenzene. The number of methyl branches was 12 per 1,000 carbon atoms, and that of hexyl and higher branches was 14 per 1,000 carbon atoms according to $^{13}$C-NMR spectrum. The number of the terminal double bond was not more than 0.2 in 1,000 carbon atoms.

EXAMPLE 7

Into a 2-liter stainless steel reactor equipped with a magnetic stirrer, which had been purged sufficiently with nitrogen, 500 ml of toluene, 2.0 mmol of bis-(1,3-diphenyl-1,3-propanediono)-nickel(II), and 10.0 mmol of bis(trimethylsilyl)amino-bis(trimethylsilylimino)-phosphorane were added. Then 16.0 mmol of triisobutylaluminum was added thereto, and the internal temperature was controlled to be at 20° C. Subsequently, ethylene was introduced therein, and was polymerized for 3.0 hours by keeping the internal pressure at 25 kg/cm$^2$G. After the completion of the reaction, the unreacted ethylene was removed, and the catalyst was decomposed by hydrochloric acid-methanol solution. The reaction mixture was poured into methanol to recover the resulting polymer, which was dried under reduced pressure for 8 hours, yielding 21 g of polymer.

The melting point was 93° C. as measured by differential scanning calorimetry (DSC). The limiting viscosity was 2.88 dl/g at 140° C. in o-dichlorobenzene. The number of methyl branches was 17 per 1,000 carbon atoms, and that of hexyl and higher branches was 6 per 1,000 carbon atoms according to $^{13}$C-NMR spectrum. The g-value was 0.68, the molecular weight distribution determined by GPC was 2.4, and the number of the terminal double bond was not more than 0.2 in 1,000 carbon atoms.

EXAMPLE 8

Into a 2-liter stainless steel reactor equipped with a magnetic stirrer, which had been purged sufficiently with nitrogen, 500 ml of toluene, 2.0 mmol of bis-(2,6-dimethyl-3,5-heptanediono)-nickel(II), and 10.0 mmol of bis(trimethylsilyl)amino-bis(trimethylsilylimino)-phosphorane were added. Then 16.0 mmol of triisobutylaluminum was added thereto, and the internal temperature was controlled to be at 20° C. Subsequently, ethylene was introduced therein, and was polymerized for 3.0 hours by keeping the internal pressure at 25 kg/cm$^2$G. After the completion of the reaction, the unreacted ethylene was removed, and the catalyst was decomposed by hydrochloric acid-methanol solution. The reaction mixture was poured into methanol to recover the resulting polymer, which was dried under reduced pressure for 8 hours, yielding 140 g of polymer.

The melting point was 91° C. as measured by differential scanning calorimetry (DSC). The limiting viscosity was 1.32 dl/g at 140° C. in o-dichlorobenzene. The number or methyl branches was 22 per 1,000 carbon atoms, and that of hexyl and higher branches was 17 per 1,000 carbon atoms according to $^{13}$C-NMR spectrum. The g-value was 0.71, the molecular weight distribution determined by GPC was 1.9, and the number of the terminal double bond was not more than 0.2 in 1,000 carbon atoms.

EXAMPLE 9

Into a 2-liter stainless steel reactor equipped with a magnetic stirrer, which had been purged sufficiently with nitrogen, 500 ml of toluene, 2.0 mmol of bis-(4-phenyl-2,4-butanediono)-nickel(II), and 10.0 mmol of bis(trimethylsilyl)amino-bis(trimethylsilylimino)-phosphorane were added. Then 16.0 mmol of triisobutylaluminum was added thereto, and the internal temperature was controlled to be at 20° C. Subsequently, ethylene was introduced therein, and was polymerized for 3.0 hours by keeping the internal pressure at 25 kg/cm$^2$G. After the completion of the reaction, the unreacted ethylene was removed, and the catalyst was decomposed by hydrochloric acid-methanol solution. The reaction mixture was poured into methanol to recover the resulting polymer, which was dried under reduced pressure for 8 hours, yielding 84 g of polymer.

The melting point was 88° C. as measured by differential scanning calorimetry (DSC). The limiting viscosity was 2.15 dl/g at 140° C. in o-dichlorobenzene. The number of methyl branches was 22 per 1,000 carbon atoms, and that of hexyl and higher branches was 15 per 1,000 carbon atoms according to $^{13}$C-NMR spectrum. The g-value was 0.68, the molecular weight distribution determined by GPC was 2.0, and the number of the terminal double bond was not more than 0.2 in 1,000 carbon atoms.

EXAMPLE 10

Into a 2-liter stainless steel reactor equipped with a magnetic stirrer, which had been purged sufficiently with nitrogen, 500 ml of toluene, 2.0 mmol of bis-(3-oxobutanalato)-nickel(II), and 10.0 mmol of bis(trimethylsilyl)amino-bis(trimethylsilylimino)-phosphorane were added. Then 16.0 mmol of triisobutylaluminum was added thereto, and the internal temperature was controlled to be at 20° C. Subsequently, ethylene was introduced therein, and was polymerized for 3.0 hours by keeping the internal pressure at 25 kg/cm$^2$G. After the completion of the reaction, the unreacted ethylene was removed, and the catalyst was decomposed by hydrochloric acid-methanol solution. The reaction mixture was poured into methanol to recover the resulting polymer, which was dried under reduced pressure for 8 hours, yielding 2.0 g of polymer.

Two melting points of 90° C. and 77° C. were observed by differential scanning calorimetry (DSC). The limiting viscosity was 0.74 dl/g at 140° C. in o-dichlorobenzene. The number of methyl branches was 18 per 1,000 carbon atoms, and that of hexyl and higher branches was 22 per 1,000 carbon atoms according to $^{13}$C-NMR spectrum. The number of the terminal double bond was not more than 0.2 in 1,000 carbon atoms.

EXAMPLE 11

Into a 2-liter stainless steel reactor equipped with a magnetic stirrer, which had been purged sufficiently with nitrogen, 500 ml of toluene, 2.0 mmol of bis-(2-methyl-3-oxobutanalato)-nickel(II), 10.0 mmol of bis(-trimethylsilyl)amino-bis(trimethylsilylimino)-phosphorane were added. Then 16.0 mmol of triisobutylaluminum was added thereto, and the internal temperature was controlled to be at 20° C. Subsequently, ethylene was introduced therein, and was polymerized for 3.0 hours by keeping the internal pressure at 25 kg/cm$^2$G. After the completion of the reaction, the unreacted ethylene was removed, and the catalyst was decomposed by hydrochloric acid-methanol solution. The reaction mixture was poured into methanol to recover the resulting polymer, which was dried under reduced pressure for 8 hours, yielding 56 g of polymer.

The melting point was 91° C. as measured by differential scanning calorimetry (DSC). The limiting viscosity was 0.91 dl/g at 140° C. in o-dichlorobenzene. The number of methyl branches was 19 per 1,000 carbon atoms, and that of hexyl and higher branches was 23 per 1,000 carbon atoms according to $^{13}$C-NMR spectrum. The g-value was 0.64, the molecular weight distribution determined by GPC was 2.3, and the number of the terminal double bond was not more than 0.2 in 1,000 carbon atoms.

As described above, the present invention provides novel polyethylene which is useful for inflation films, injection-molded articles, blow-molded articles, extrusion-coating materials, polymer blend materials, and so forth.

We claim:
1. A process for producing polyethylene comprising:
   (a) forming a catalyst by (i) first contacting a coordination nickel compound of bivalent nickel with an amino-bis(imino)phosphorane represented by the general formula (I) below:

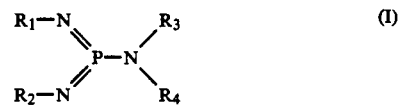

where $R_1$, $R_2$, $R_3$, and $R_4$ may be the same or different and are selected from the group consisting of n-alkyl, isoalkyl, aryl, or trialkylsilyl, and then (ii) adding an organoaluminum compound; and (b) polymerizing ethylene in the presence of the catalyst formed by step (a).

2. A process according to claim 1, in which the organoaluminum compound is selected from the group consisting of compounds represented by the general formula $AlR_sX_{3-s}$, wherein s in an integer of 2 or 3; R is alkyl of 1 to 12 carbons; and X is a halogen or alkoxy.

3. A process according to claim 1 wherein the coordination nickel compound is selected from the group consisting of nickel compounds having $\beta$-diketone as ligands, represented by the general formula (II) below:

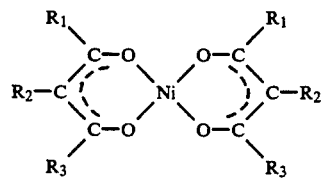

where $R_1$, $R_2$, and $R_3$ may be the same or different mutually and are respectively hydrogen, n-alkyl (having 1 to 4 carbons), isoalkyl (having 3 to 5 carbons), tert-alkyl (having 4 to 6 carbons), n-fluoroalkyl (having 1 to 4 carbons) or phenyl; nickel stearate and nickel acetate.

4. A process according to claim 1 wherein the molar ratio of the nickel compound to the amino-bis(imino)-phosphorane is from 1:1 to 1:100.

5. A process according to claim 1 wherein the molar ratio of the nickel compound to the organoaluminum compound is from 1:1 to 1:1,000.

* * * * *